United States Patent
Toyoda et al.

(10) Patent No.: US 9,684,853 B2
(45) Date of Patent: Jun. 20, 2017

(54) IMAGE FORMING APPARATUS THAT WRITES DATA FROM VOLATILE MEMORY TO NON-VOLATILE MEMORY

(71) Applicant: KYOCERA Document Solutions Inc., Osaka (JP)

(72) Inventors: Takashi Toyoda, Osaka (JP); Yuya Maesono, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/680,914

(22) Filed: Apr. 7, 2015

(65) Prior Publication Data

US 2015/0294196 A1  Oct. 15, 2015

(30) Foreign Application Priority Data

Apr. 15, 2014 (JP) ................... 2014-083642
Apr. 17, 2014 (JP) ................... 2014-085093

(51) Int. Cl.
| | |
|---|---|
| *G06K 15/00* | (2006.01) |
| *G06K 15/02* | (2006.01) |
| *G06F 12/02* | (2006.01) |
| *G06F 17/30* | (2006.01) |
| *G06F 11/14* | (2006.01) |
| *G06F 9/445* | (2006.01) |

(52) U.S. Cl.
CPC ............ *G06K 15/02* (2013.01); *G06F 8/665* (2013.01); *G06F 11/1441* (2013.01); *G06F 12/0246* (2013.01); *G06F 17/3015* (2013.01); *G06F 2212/7201* (2013.01); *G06F 2212/7202* (2013.01); *G06F 2212/7209* (2013.01)

(58) Field of Classification Search
None
See application file for complete search history.

(56) References Cited

U.S. PATENT DOCUMENTS 6,516,440 B1 *  2/2003  Teradaira .............. G06K 15/00
                                                    714/763
2004/0080773 A1 *  4/2004  Jamison ............. G06F 11/0733
                                                    358/1.14

(Continued)

FOREIGN PATENT DOCUMENTS

JP  2000-035922 A  2/2000

*Primary Examiner* — Miya J Williams
(74) *Attorney, Agent, or Firm* — Studebaker & Brackett PC

(57) ABSTRACT

An electronic device includes volatile memory, flash memory, and a CPU. The volatile memory includes a first actual data region that records actual data and a first log region that records update information including update data used for updating the actual data. The flash memory includes blocks and undergoes block unit initialization when writing is to be performed thereto. The blocks each include a second actual data region that records actual data and a second log region that records update information written from the first log region. The CPU writes update information corresponding to update data to the first log region when updating actual data using the update data. At a preset specific timing, the CPU collects update information recorded in the first log region, writes the collected update information to the second log regions in accordance with a specific order, and subsequently initializes the first log region.

6 Claims, 7 Drawing Sheets

(56) References Cited

U.S. PATENT DOCUMENTS

| | | | |
|---|---|---|---|
| 2010/0095052 A1* | 4/2010 | Chen | G06F 12/0246 |
| | | | 711/103 |
| 2011/0153973 A1* | 6/2011 | Kim | G11C 11/005 |
| | | | 711/165 |
| 2012/0271990 A1* | 10/2012 | Chen | G06F 11/1441 |
| | | | 711/103 |
| 2014/0006685 A1* | 1/2014 | Peterson | G06F 12/0238 |
| | | | 711/102 |
| 2015/0213338 A1* | 7/2015 | Toyoda | G06K 15/00 |
| | | | 358/1.16 |

* cited by examiner

| Data ID | Update data | Write count |
|---------|-------------|-------------|
| PCNT | 102 | 1 |
| PCNT | 105 | 2 |
| STAT | OK | 1 |
| ⋮ | ⋮ | ⋮ |

IMAGE FORMING APPARATUS THAT WRITES DATA FROM VOLATILE MEMORY TO NON-VOLATILE MEMORY

INCORPORATION BY REFERENCE

The present application claims priority under 35 U.S.C. §119 to Japanese Patent Application No. 2014-083642, filed Apr. 15, 2014 and Japanese Patent Application No. 2014-085093, filed Apr. 17, 2014. The contents of this application are incorporated herein by reference in their entirety.

BACKGROUND

The present disclosure relates to electronic devices and image forming apparatuses that include flash memory having an upper limit for a number of writes thereto.

In electronic devices—in particular embedded devices— and multifunction peripherals (MFPs), electrically erasable programmable read-only memory (EEPROM) is used in order to store small volumes of data used by the device even when power to the device is cut off. Recently it has become common place to use NOR flash memory as EEPROM.

EEPROM is often used as non-volatile memory for preserving small volumes of data that are stored in volatile memory composed of dynamic random access memory (DRAM) or the like.

The following technique has for example been disclosed as an optimal technique for controlling writing of data from volatile memory to non-volatile memory. In the aforementioned technique, data is grouped for each write timing and only data to be written at a specific timing is written to the non-volatile memory, thereby reducing the amount of time required for writing.

In flash memory, erasing of data in block units (initialization) is performed prior to writing of data in page units. In consideration of the fact that flash memory has a structural upper limit for the number of times initialization can be performed (number of writes), a technique referred to as wear leveling has been disclosed in which writing is performed evenly in order to avoid intensive writing to a specific block.

Journaling Flash File System, version 2 (JFFS2) is an example of a file system for performing wear leveling that includes journaling and that is optimized for properties of NAND flash memory. JFFS2 is a file system for Linux (registered Japanese trademark) that is commonly used in embedded devices.

SUMMARY

An electronic device according to one aspect of the present disclosure includes a volatile memory, a flash memory, and a CPU. The volatile memory includes a first actual data region that records actual data therein and a first log region. The first log region records one or more pieces of update information therein, each including at least update data that is used for updating the actual data recorded in the first actual data region. The flash memory includes a plurality of blocks and undergoes initialization in block units when either or both of the actual data and the update information are to be written thereto. The blocks each include a second actual data region and a second log region. The second actual data region records at least a portion of the actual data therein. The second log region records update information therein that is written from the first log region. The CPU writes each of the pieces of update information to the first log region when updating the actual data in the first actual data region using update data corresponding to the piece of update information. At a preset specific timing, the CPU collects one or more of the pieces of update information recorded in the first log region. The CPU writes the pieces of update information that are collected to the second log regions in accordance with a specific order and subsequently initializes the first log region.

An image forming apparatus according to another aspect of the present disclosure includes an image forming section for forming an image on a recording medium, wherein the image forming apparatus is the electronic device described above.

DETAILED DESCRIPTION

The following explains embodiments of the present disclosure with reference to the drawings. Note that in the following explanation, an image forming apparatus is used as an example of an electronic device according to the present disclosure. Also, the present embodiments are explained using NOR flash memory as an example of non-volatile memory that has an upper limit for a number of writes thereto and that is initialized in block units. Although explanation of the present embodiments is given for NOR flash memory, the present disclosure can also be applied to NAND flash memory. In the following explanation, the aforementioned non-volatile memory is indicated and explained as EEPROM.

1. First Embodiment

Image Forming Apparatus Configuration

Figure 1:
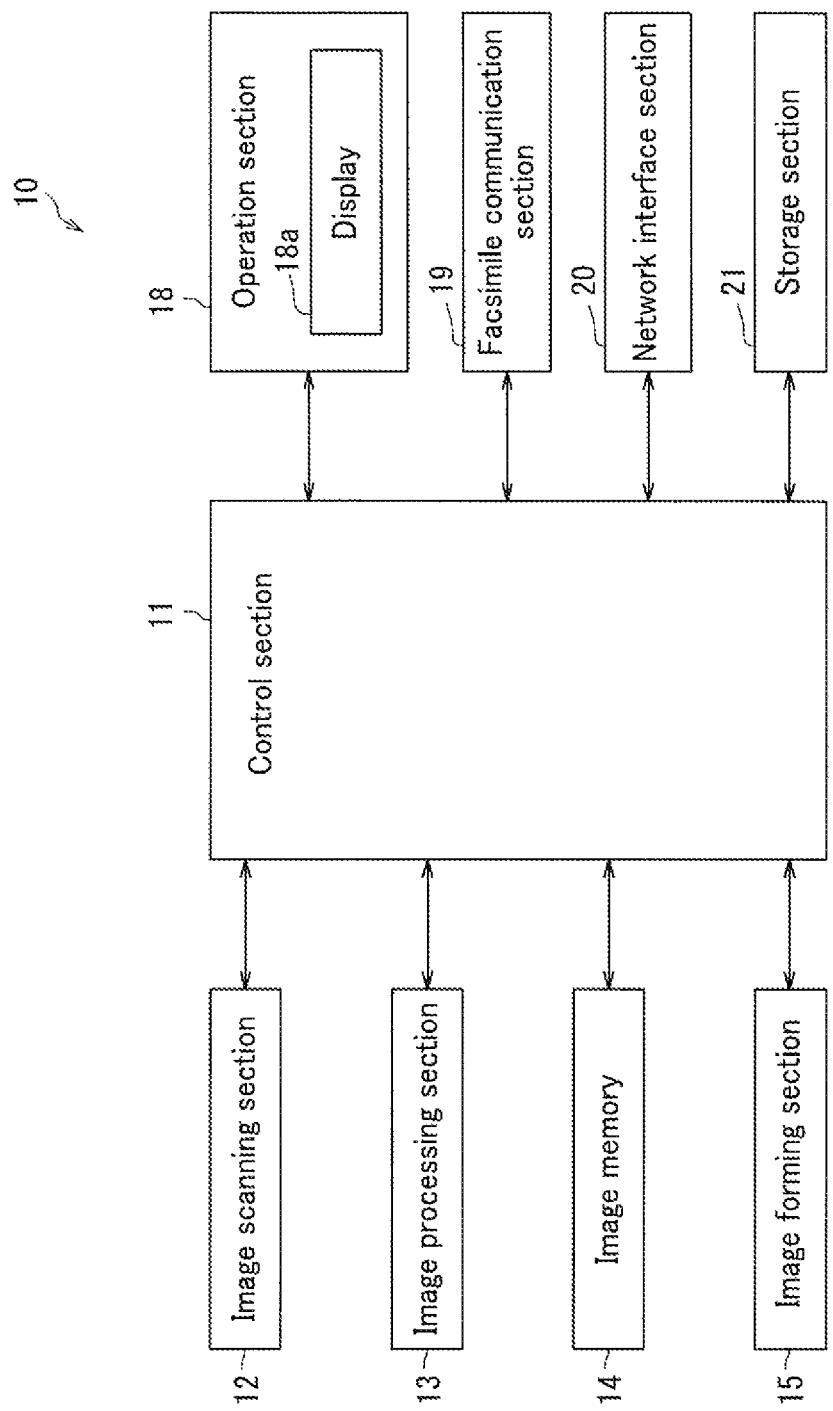
FIG. 1 illustrates configuration of an image forming apparatus according to an embodiment of the present disclosure.

Explanation is first provided of configuration of an image forming apparatus according to an embodiment of the present disclosure. FIG. 1 illustrates configuration of an image forming apparatus 10 according to an embodiment of the present disclosure.

The image forming apparatus 10 includes a control section 11. The control section 11 performs overall control of the image forming apparatus 10. Configuration of the control section 11 is explained further below.

The control section 11 is connected to an image scanning section 12, an image processing section 13, an image memory 14, an image forming section 15, an operation section 18, a facsimile communication section 19, a network interface section 20, and a storage section 21. The control section 11 performs control of each of the sections (blocks) connected thereto and performs transmission and reception of a signal or data with each of the blocks.

The control section 11 performs control for implementing various functions, such as a scanning function, a printing function, a copying function, and a facsimile function, in accordance with an execution instruction for a job input by a user through, for example, the operation section 18 or a personal computer connected thereto through a network.

The image scanning section 12 scans an image of a document.

The image processing section 13 performs image processing, in accordance with necessity thereof, on image data of an image scanned by the image scanning section 12. The image processing section 13 for example performs image processing such as shading correction in order to improve image quality of a formed image when image formation is performed with respect to an image that has been scanned by the image scanning section 12.

The image memory 14 is a region for temporarily storing data of a document image scanned by the image scanning section 12 and also for temporarily storing data of a printing target of the image forming section 15.

The image forming section 15 performs image formation based, for example, on image data acquired through scanning by the image scanning section 12.

The operation section 18 includes a touch panel section and operation keys for receiving input from a user pertaining to various operations and processing that can be performed by the image forming apparatus 10. The touch panel section includes a display 18a that is for example a liquid-crystal display (LCD) equipped with a touch panel.

The facsimile communication section 19 includes an encoding section, a decoding section, a modem section, and a network control unit (NCU) that are not illustrated in the drawings. The facsimile communication section 19 performs transmission and reception of facsimiles using a public telephone line network.

The network interface section 20 is formed by a communication module such as a LAN board. The network interface section 20 performs transmission and reception of various types of data with local area devices (external devices such as a server and a personal computer) via a LAN to which the network interface section 20 is connected.

The storage section 21 for example stores a document image scanned by the image scanning section 12. The storage section 21 is a large capacity storage device such as a hard disk drive (HDD).

Through the above, configuration of the image forming apparatus 10 according to the embodiment of the present disclosure has been explained.

Control Section Configuration

Figure 2:
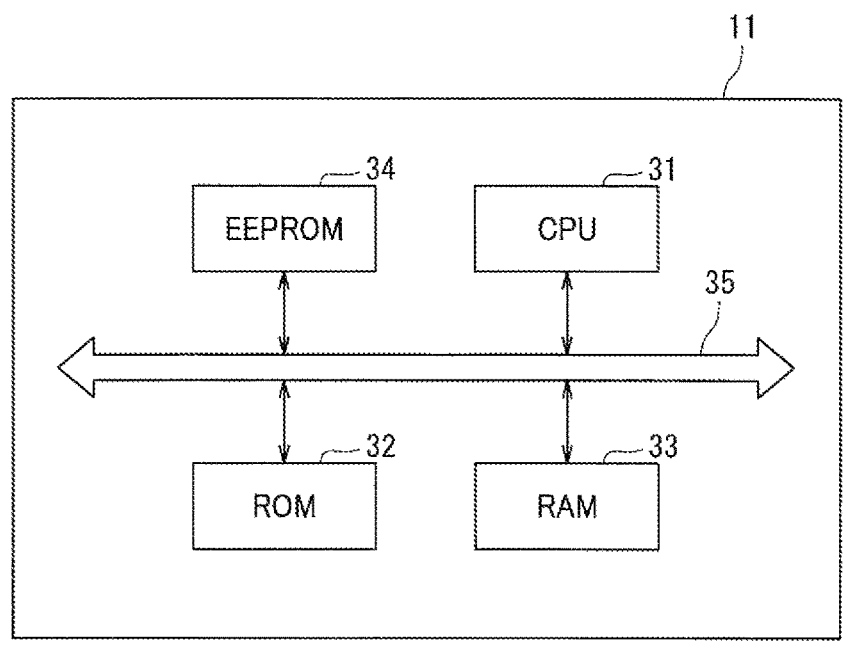
FIG. 2 illustrates configuration of a control section.

The following explains configuration of the control section 11 mentioned above. FIG. 2 illustrates configuration of the control section 11.

As illustrated in FIG. 2, the control section 11 includes a CPU 31, read only memory (ROM) 32, random access memory (RAM) 33 (volatile memory), and EEPROM 34 (flash memory). The blocks listed above are connected to one another by a bus 35. Internal configuration of the RAM 33 and the EEPROM 34 is explained further below.

The ROM 32 stores data and a plurality of programs, such as firmware for performing various processing, in read-only form. The RAM 33 is used as a work area by the CPU 31 and temporarily stores an operating system (OS), various applications that are being executed, and various types of data that are being processed.

The EEPROM 34 is flash memory that is required to undergo initialization in block units prior to writing data thereto and that has an upper limit for the number of initializations.

The CPU 31 controls each of the sections in accordance with a program stored in the ROM 32 or the storage section 21.

Through the above, configuration of the control section 11 has been explained.

RAM Configuration

Figure 3:
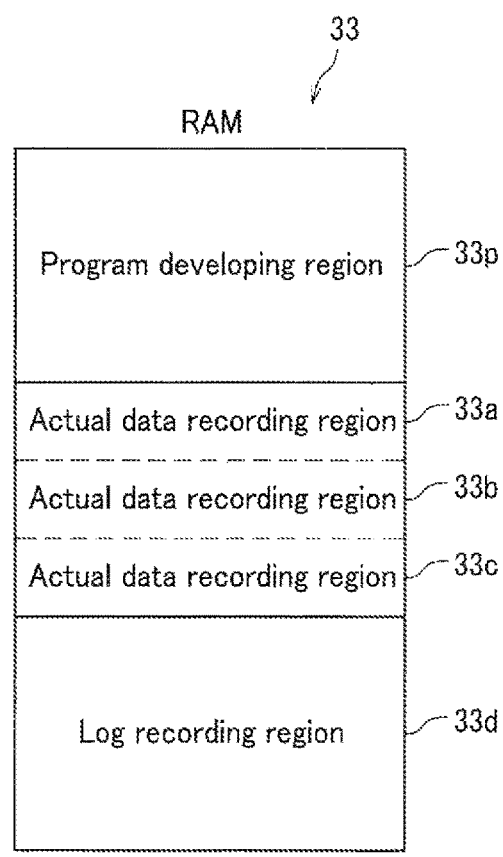
FIG. 3 illustrates an example of RAM configuration.

The following explains configuration of the RAM 33. FIG. 3 illustrates an example of configuration of the RAM 33.

As illustrated in FIG. 3, the RAM 33 is partitioned into a program developing region 33p, actual data recording regions 33a, 33b, and 33c, and a log recording region 33d. The program developing region 33p is used to develop a program executed by the CPU 31 and as working memory during execution of the program. The actual data recording regions 33a to 33c store values for variables used by the program. Region partitioning of the RAM 33 may be performed theoretically or physically. The actual data recording regions 33a to 33c are equivalent to a "first actual data region". The log recording region 33d is equivalent to a "first log region".

Although an actual data recording region is formed by three regions in the present explanation, such a configuration is only an example and the actual data recording region may be formed by any number of regions.

For example, suppose a situation in which a variable name of a printing counter used to count the number of sheets printed by the image forming apparatus 10 is denoted PCNT. The actual data recording region 33a is used to store a value for PCNT. In a situation in which at the present point in time printing has for example been performed on 100 sheets, a value of "100" is stored in the actual data recording region 33a.

When the image forming apparatus 10 then for example performs printing on a further 2 sheets, the value for the printing counter PCNT in the actual data recording region 33a is updated from "100" to "102". The CPU 31 writes a piece of update information to the log recording region 33d such as "PCNT, 102, 1".

The update information recorded in the log recording region 33d includes update data that has been used in the aforementioned updating (i.e., "102" in the above example). The update information is formed by three items: a data ID, the update data, and a write count. The write count is a counter indicating the number of times that data updating has been performed since performance of refresh processing (explained further below).

In a situation in which a plurality of pieces of update information each having a data ID of "PCNT" are recorded in the log recording region 33d, an up-to-date value for the variable PCNT can be determined by selecting a piece of update information including a largest value write count from among the plurality of pieces of update information.

In a situation in which, for example, the image forming apparatus 10 performs printing on a further 3 sheets, the value for the printing counter PCNT in the actual data recording region 33a is updated from "102" to "105". In the above situation, an entry of "PCNT, 105, 2" is written to the log recording region 33d as a next entry after the entry of "PCNT, 102, 1" in the first row (refer to FIG. 4).

Figures 4, 5:
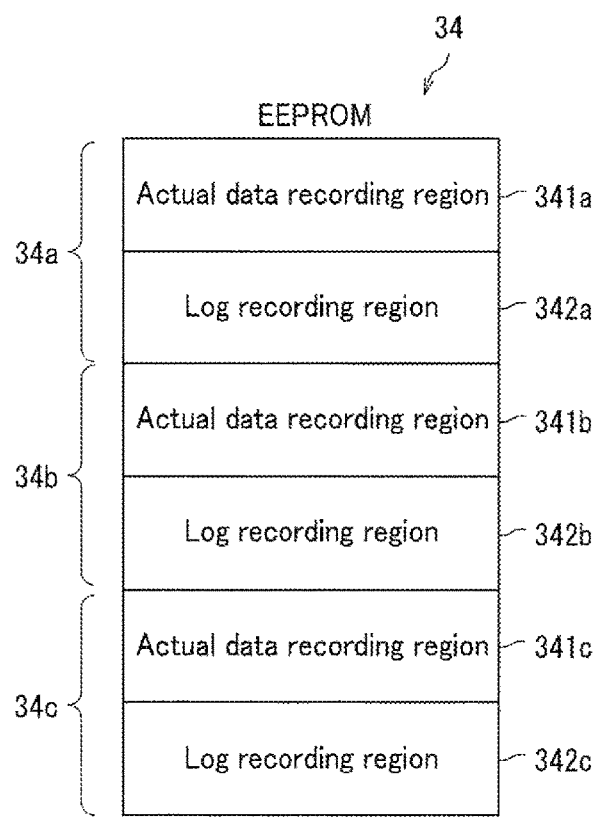
FIG. 4 illustrates an example of configuration of update information recorded in a log recording region.
FIG. 5 illustrates an example of EEPROM configuration.

Note that an entry in the third row in FIG. 4 for example indicates that a value "OK" has been written as first update data for a variable STAT. The variable STAT is a variable that indicates the status of the image forming apparatus 10 and is stored in the actual data recording region 33c illustrated in FIG. 3.

In order to simplify explanation, the above explains an example in which a value for one variable—print counter PCNT—is stored in one actual data recording region 33a, but the above configuration is not a limitation and values for a plurality of variables may be stored in one actual data recording region.

Also, the electronic device according to the present disclosure is envisaged as being an embedded device or the like and thus it is preferable that a designer of the electronic device is aware of and determines in advance a name (data ID) of each variable, such as a counter, and also a data length and a memory address for storage thereof.

The program developing region 33p is not a key point of the present disclosure and thus explanation thereof is omitted below.

Through the above, configuration of the RAM 33 has been explained.

EEPROM 34 Configuration

The following explains configuration of the EEPROM 34. FIG. 5 illustrates an example of configuration of the EEPROM 34.

In the example illustrated in FIG. 5, the EEPROM 34 includes three blocks 34a, 34b, and 34c. When data is to be written to the EEPROM 34, it is necessary to perform initialization in block units prior to writing the data. The EEPROM 34 has an upper limit for the number of initializations.

The block 34a is partitioned into an actual data recording region 341a and a log recording region 342a.

The block 34b is partitioned into an actual data recording region 341b and a log recording region 342b.

The block 34c is partitioned into an actual data recording region 341c and a log recording region 342c. The actual data recording region 341a, the actual data recording region 341b, and the actual data recording region 341c are each equivalent to a "second actual data region". The log recording region 342a, the log recording region 342b, and the log recording region 342c are each equivalent to a "second log region".

Partitioning of the EEPROM 34 into the six regions explained above may be performed theoretically or physically.

Actual data corresponding to the contents of the actual data recording region 33a is recorded in the actual data recording region 341a.

Actual data corresponding to the contents of the actual data recording region 33b is recorded in the actual data recording region 341b. Actual data corresponding to the contents of the actual data recording region 33c is recorded in the actual data recording region 341c.

In other words, the actual data recording region 33a, the actual data recording region 33b, and the actual data recording region 33c may respectively have the same capacity as the actual data recording region 341a, the actual data recording region 341b, and the actual data recording region 341c.

Update information such as that illustrated in FIG. 4 is recorded in the log recording regions 342a to 342c. The method by which update information is recorded in the log recording regions 342a to 342c is explained further below.

It should be noted that in a situation in which, for example, storage of the value for the printing counter PCNT is assigned to the actual data recording region 33a illustrated in FIG. 3, storage of the value for the printing counter PCNT is also assigned to the actual data recording region 341a. On the other hand, update information for the printing counter PCNT is not necessarily recorded in the log recording region 342a and update information for the variable STAT indicating the status of the image forming apparatus 10 may be recorded in the log recording region 342a.

Also, for a reason explained further below with reference to FIG. 8, preferably the log recording regions 342a to 342c each have a greater capacity than the log recording region 33d illustrated in FIG. 3.

Through the above, configuration of the EEPROM 34 has been explained.

Processing Flow During Start-Up

Figure 6:
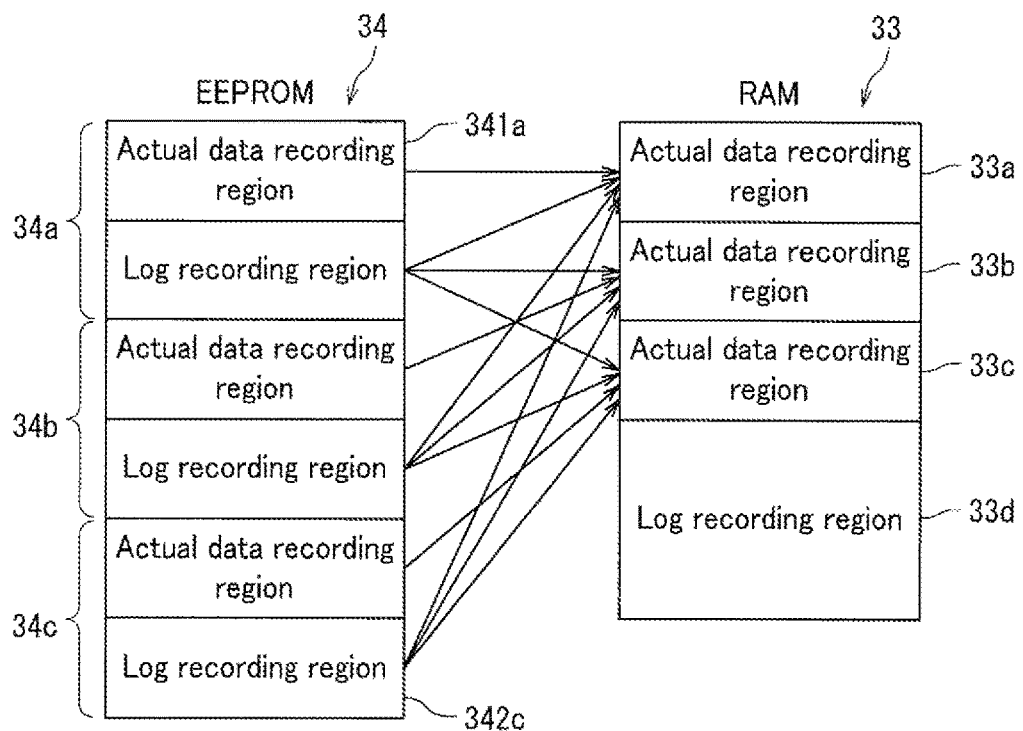
FIG. 6 illustrates data processing between EEPROM and RAM when an image forming apparatus is started up.

The following explains the flow of data processing between the EEPROM 34 and the RAM 33 during start-up of the image forming apparatus 10. FIG. 6 illustrates data processing between the EEPROM 34 and the RAM 33 during start-up of the image forming apparatus 10.

Prior to start-up of the image forming apparatus 10, there is no data in the RAM 33 and all data (actual data and update information) is in the EEPROM 34.

For example, a value of "100" for the printing counter PCNT is recorded in the actual data recording region 341a and a piece of update information "PCNT, 102, 1" for the printing counter PCNT is recorded in the log recording region 342b. Also, a piece of update information "PCNT, 105, 2" for the printing counter PCNT is recorded in the log recording region 342c.

Upon start-up of the image forming apparatus 10, once the RAM 33 has been initialized, contents of the actual data recording region 341a, the actual data recording region 341b, and the actual data recording region 341c are respectively copied to the actual data recording region 33a, the actual data recording region 33b, and the actual data recording region 33c corresponding thereto.

Next, data in the actual data recording regions 33a, 33b, and 33c is overwritten using most recent update information among update information recorded in the log recording regions 342a to 342c.

Through the above processing, a state is reached in which up-to-date actual data is stored in the actual data recording regions 33a to 33c of the RAM 33.

Through the above, the flow of data processing between the EEPROM 34 and the RAM 33 during start-up of the image forming apparatus 10 has been explained.

Processing Flow During Update of Actual Data in RAM

Figure 7:
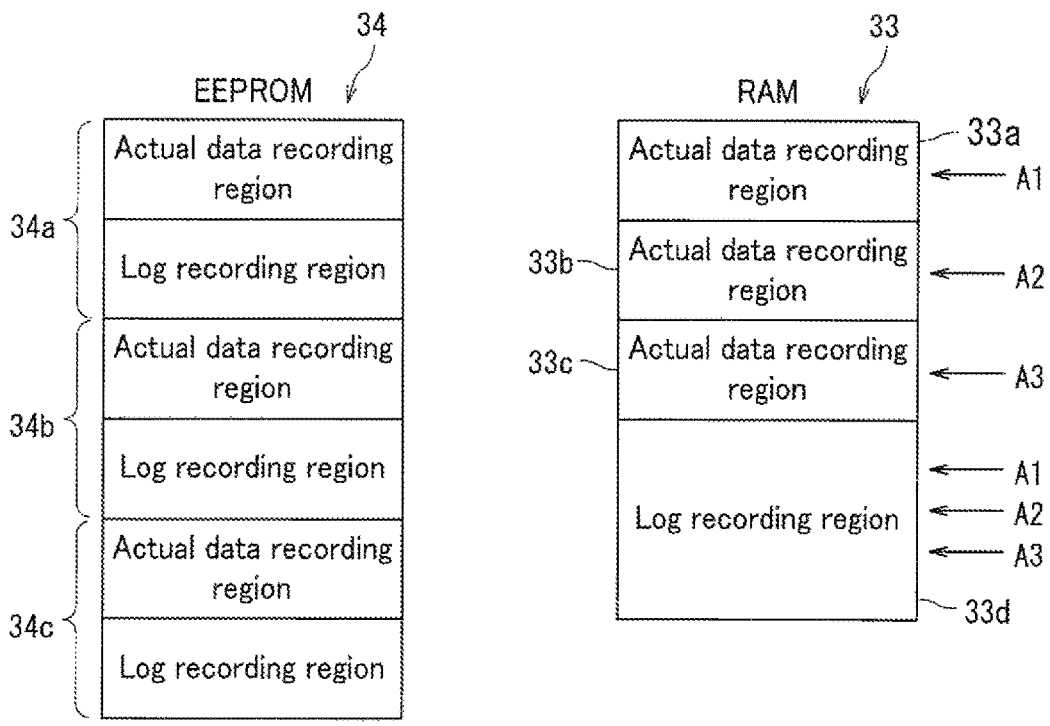
FIG. 7 illustrates processing when a CPU updates actual data in RAM.

The following explains processing performed by the CPU 31 for updating actual data in the RAM 33. FIG. 7 illustrates the processing performed by the CPU 31 for updating the actual data in the RAM 33.

For example, when the value for the printing counter PCNT in the actual data recording region 33a is updated from "100" to "102", a piece of update information "PCNT, 102, 1" is written to the log recording region 33d as explained above.

Thus, a piece of update information is additionally written to the log recording region 33d each time update processing occurs for actual data in any of the actual data recording regions 33a to 33c (processes A1 to A3 illustrated in FIG. 7).

Processing that accompanies updating of actual data is normally complete once updating has been performed with respect to the RAM 33 and processing for writing to the EEPROM 34 is not normally performed.

As a result of not performing writing to the EEPROM 34 every time that the RAM 33 is updated, the number of writes to the EEPROM 34 can be reduced and thus the lifetime of the EEPROM 34 can be extended.

Through the above, the flow of processing during updating of actual data in the RAM 33 by the CPU 31 has been explained.

Processing Flow During Writing to EEPROM

The following explains the flow of processing when data in the RAM 33 is written to the EEPROM 34 at a specific timing. FIG. 8 illustrates the processing when the data in the RAM 33 is written to the EEPROM 34 at the specific timing.

Note that the aforementioned specific timing may for example be a periodic timing that is triggered by a timer, a timing at which a collective writing command is executed upon, for example, shutdown of the image forming apparatus 10, a timing at which specific actual data is updated, or a timing at which there is no longer any free space in the log recording region 33d.

At the specific timing, the CPU 31 first collects pieces of update information in the log recording region 33d of the RAM 33 and writes the collected update information to any one of the log recording regions 342a to 342c of the EEPROM 34. The writing is performed in a form such that the collected update information is added to update information that is already recorded in the log recording regions 342a to 342c.

The writing is performed by switching between blocks in order. In other words, supposing that writing is performed to the third block (block 34c) at one instance of the specific timing, writing is performed to the first block (block 34a) at a next instance of the specific timing.

The order in which writing is performed to the blocks is preset. For example, update information may be written to the blocks by repeating a preset order of writing to the first block, followed by the second block, followed by the third block, and then starting again from the first block.

Figure 8:
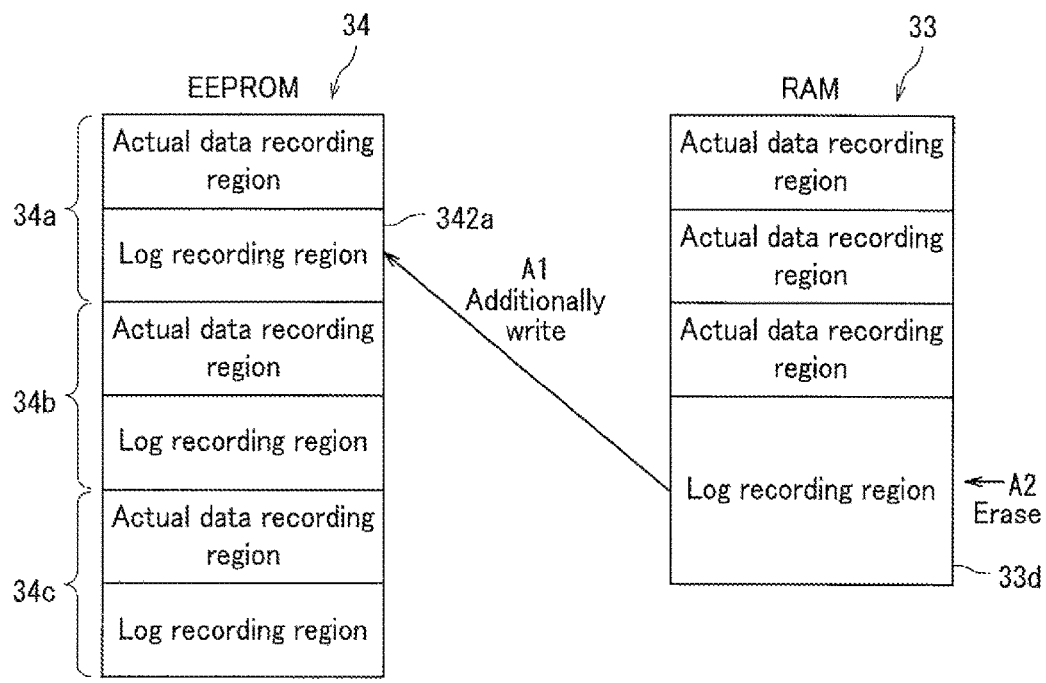
FIG. 8 illustrates processing when data in RAM is written to EEPROM at a specific timing.

Suppose that in the example illustrated in FIG. 8, writing has been performed to the third block at a previous instance of the specific timing. Thus, at the present instance of the specific timing, writing is performed to the first block (process A1 illustrated in FIG. 8).

In a situation in which free space of the log recording region of a given block is insufficient during writing of collected update information, a remaining portion of the collected update information is written to a block that is scheduled to be written to next.

Once the writing is complete, the CPU 31 erases the update information recorded in the log recording region 33d (process A2 illustrated in FIG. 8).

A key point of the processing described above is that only the collected update data is written to only a specific block of the EEPROM 34 without writing actual data to the EEPROM 34 from the RAM 33.

By adopting the configuration described above, the number of writes to the EEPROM 34 can be reduced and writing can be performed evenly to the blocks of the EEPROM 34 (i.e., wear leveling can be performed).

Through the above, the processing when data in the RAM 33 is written to the EEPROM 34 at the specific timing has been explained.

Processing Flow During Refreshing

Figure 9:
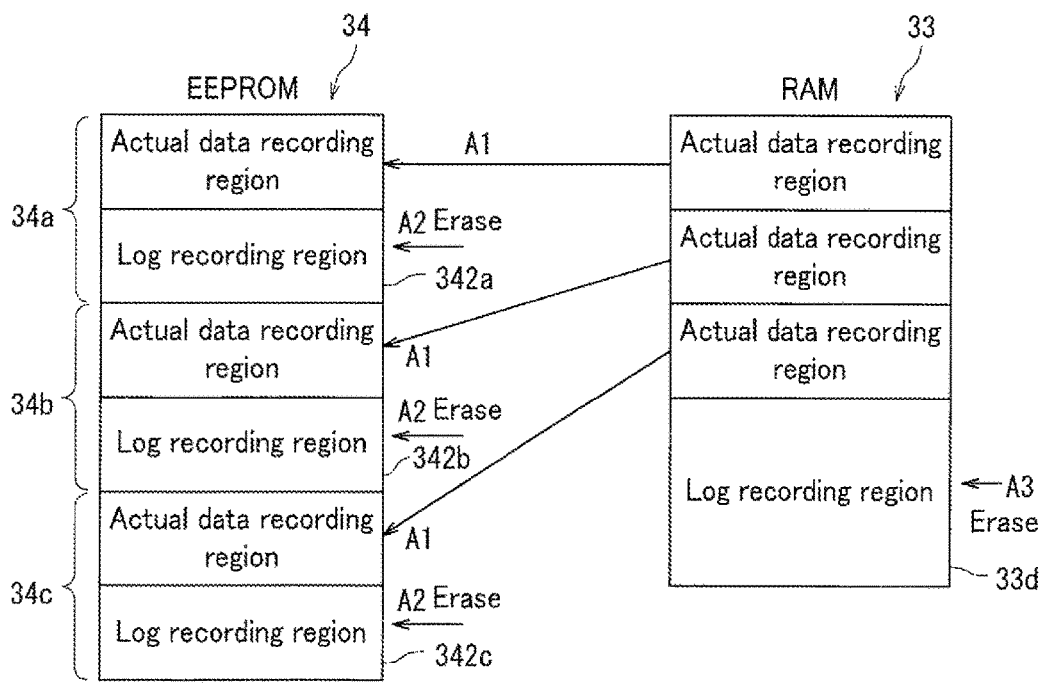
FIG. 9 illustrates refresh processing.

The following explains refresh processing. FIG. 9 is provided in order to facilitate explanation of the refresh processing.

The refresh processing is processing that is performed when free space of the log recording region of a given block is insufficient at the specific timing described above and thus update information recorded in the log recording region 33d cannot be copied to the log recording region that has insufficient free space.

In the refresh processing, actual data in each of the actual data recording regions 341a to 341c of the EEPROM 34 is overwritten with actual data in the corresponding one of the actual data recording regions 33a to 33c of the RAM 33 (process A1 illustrated in FIG. 9).

The actual data in the actual data recording regions 33a to 33c of the RAM 33 is in an up-to-date state and thus as a result the processing described above, the actual data in the actual data recording regions 341a to 341c is also in an up-to-date state.

Therefore, update information in the log recording region 33d of the RAM 33 and update information in the log recording regions 342a to 342c of the EEPROM 34 is erased (processes A2 and A3 illustrated in FIG. 9) as the update information is no longer required for updating the actual data to an up-to-date state.

The reason for performing the refresh processing is that if writing processing is for example performed at the specific timing described above in a situation in which the log recording regions of the first and second blocks have insufficient free space, writing is performed intensively to the third block and thus cannot be performed evenly.

Through the above, the flow of processing during refreshing has been explained.

2. Second Embodiment

The following explains an image forming apparatus 10a according to a second embodiment. The image forming apparatus 10a is an apparatus in which the control section 11 of the image forming apparatus 10 has been partially modified.

The following explains two points of modification and the modification methods thereof. Note that modification methods involve a partial change of the control section 11 and do not involve any change to actual configuration of the image forming apparatus 10a or the control section 11. Therefore, elements are referred to using the same reference signs as in the first embodiment and explanation of configuration is omitted.

Points of Modification and Modification Methods (Part 1)

First explanation is given of a first point of modification of the image forming apparatus 10 according to the first embodiment and a modification method thereof.

Suppose for example that updating of data for the printing counter PCNT occurs regularly and that timing for writing to the EEPROM 34 is considered to have been reached once six pieces of update information for the printing counter PCNT have accumulated in the log recording region 33d of the RAM 33.

Figure 10:
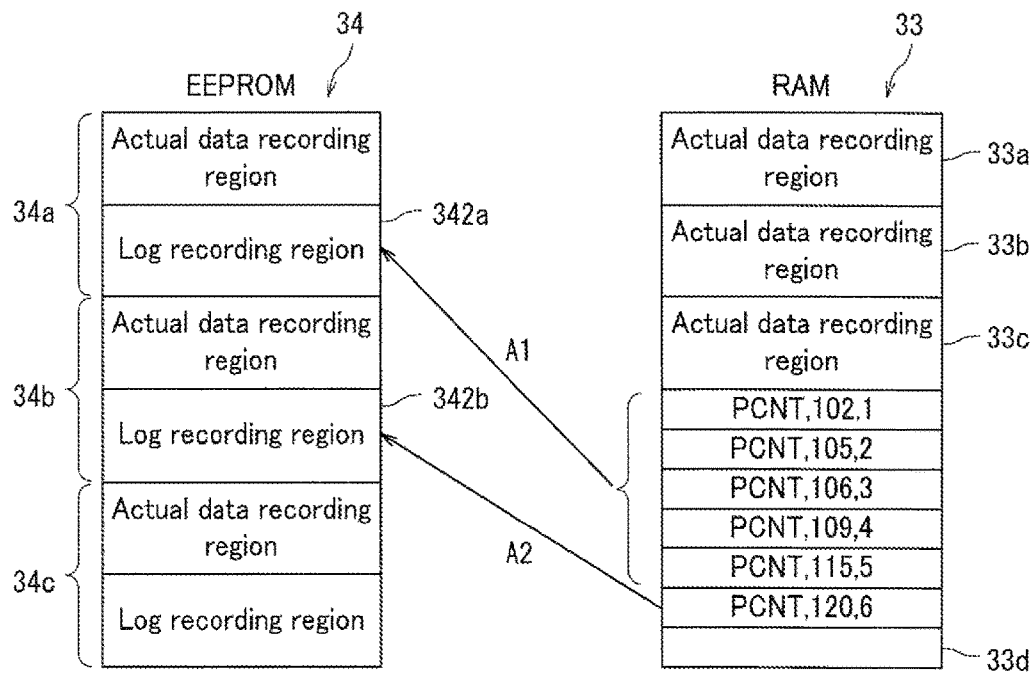
FIG. 10 illustrates a situation in which update information to be additionally written is too large to be written to a log recording region of one block and in which writing to a log recording region of a next block is required.

In such a situation, the control section 11 of the image forming apparatus 10 according to the first embodiment collects all pieces of update information in the log recording region 33d and additionally writes the collected update information to a given log recording region of the EEPROM 34. In a situation such as illustrated for example in FIG. 10 in which the update information is too large to be additionally written to the log recording region 342a of one block, it is necessary to also perform writing to the log recording region 342b of the next block (processes A1 and A2 illustrated in FIG. 10).

In consideration of the above, in the control section 11 of the image forming apparatus 10a according to the second embodiment, the data amount of collected update information that is to be written to the EEPROM 34 is reduced.

Namely, when the control section 11 of the image forming apparatus 10a collects pieces of update information from the log recording region 33d for writing to a given one of the log recording regions 342a to 342c at the specific timing, the control section 11 extracts only a most recent piece of update information for each data ID and collects the extracted pieces of update information.

Figure 11:
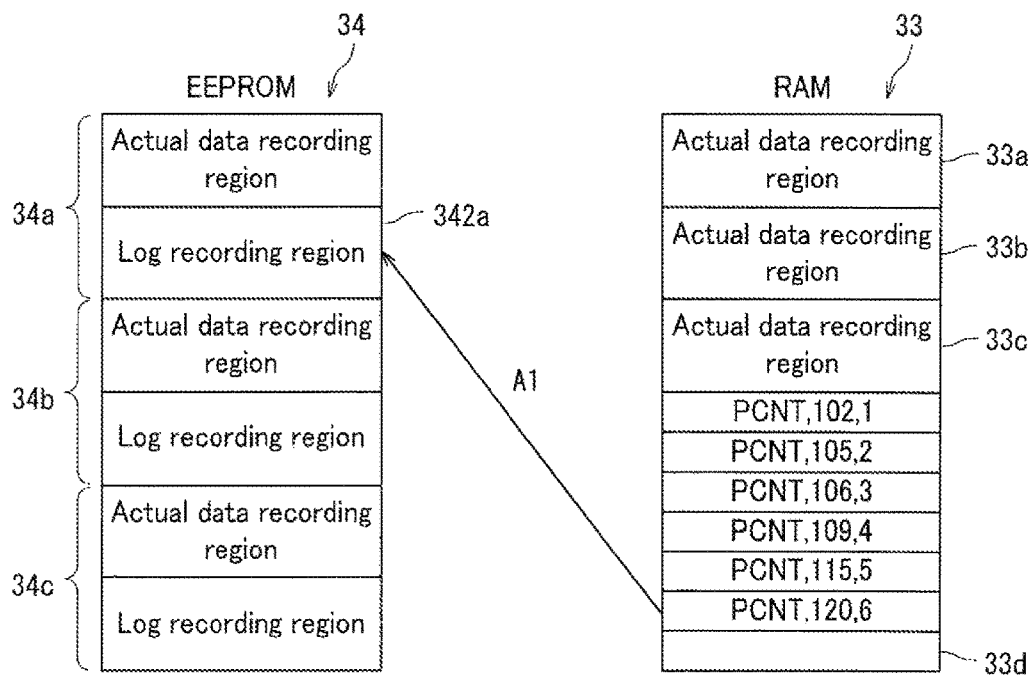
FIG. 11 illustrates a situation in which only most recent update information is extracted by referring to a write counter and in which only the most recent update information is written to the EEPROM.

In the example described above in which there are six pieces of update information for the printing counter PCNT, the control section 11 only extracts a most recent piece of update information from among the six pieces of update information by referring to the write counts thereof (update count information) (process A1 illustrated in FIG. 11). Therefore, the amount of update information that is written to the EEPROM 34 can be reduced to one sixth in the example described above (refer to FIG. 11).

Through the above, the first point of modification of the image forming apparatus 10 according to the first embodiment and the modification method thereof have been explained.

Points of Modification and Modification Methods (Part 2)

First explanation is given of a second point of modification of the image forming apparatus 10 according to the first embodiment and a modification method thereof.

Figure 12:
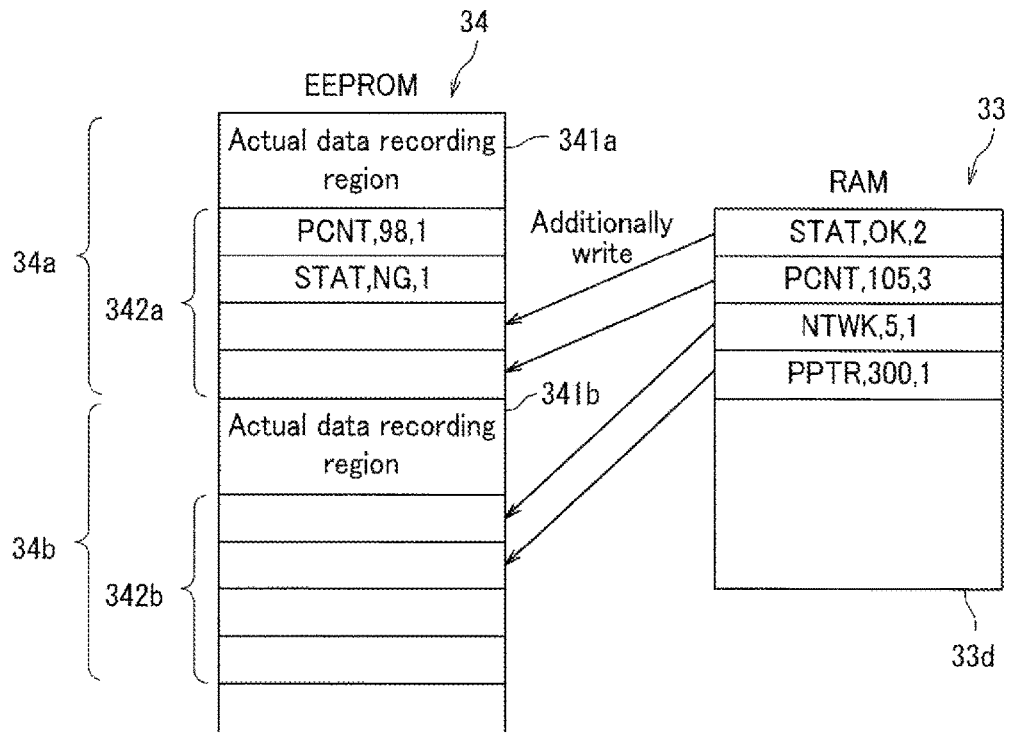
FIG. 12 illustrates a situation in which a log recording region of a first block is insufficient and in which writing of update information is also performed to a log recording region of a second block.

Suppose for example that each of the log recording regions 342a to 342c in the EEPROM 34 has capacity for recording four pieces of update information as illustrated in FIG. 12. Also suppose that at a present write timing, writing starts from the log recording region 342a of the first block. The log recording region 342a already has update information recorded as two entries therein and thus only two entries are free for writing.

When additional writing of four pieces of update information from the log recording region 33d of the RAM 33 is to be performed in the state described above, the log recording region 342a has insufficient free space and thus some of the pieces of update information are additionally written to the log recording region 342b of the second block. Therefore, the number of blocks to which writing is performed is increased to two in the above situation.

In consideration of the above, the control section 11 of the image forming apparatus 10a according to the second embodiment does not simply additionally write update information in the RAM 33 to a given log recording region of the EEPROM 34, but also reads update information that is already recorded in the log recording region of the EEPROM 34 to which writing is to be performed. When a piece of update information to be written has the same data ID as a piece of recorded update information that is read, the update information having the same data ID is overwritten on the piece of update information that is already recorded.

Supposing the same situation as illustrated in FIG. 12, with respect to actual data of "STAT" and "PCNT" for each of which a piece of update information to be written has the same data ID (data identifier) as a piece of update information that is already recorded, the pieces of update information to be written are not additionally written, but are instead overwritten on the already recorded pieces of update information "PCNT, 98, 1" and "STAT, NG, 1" which are out-of-date.

Figure 13:
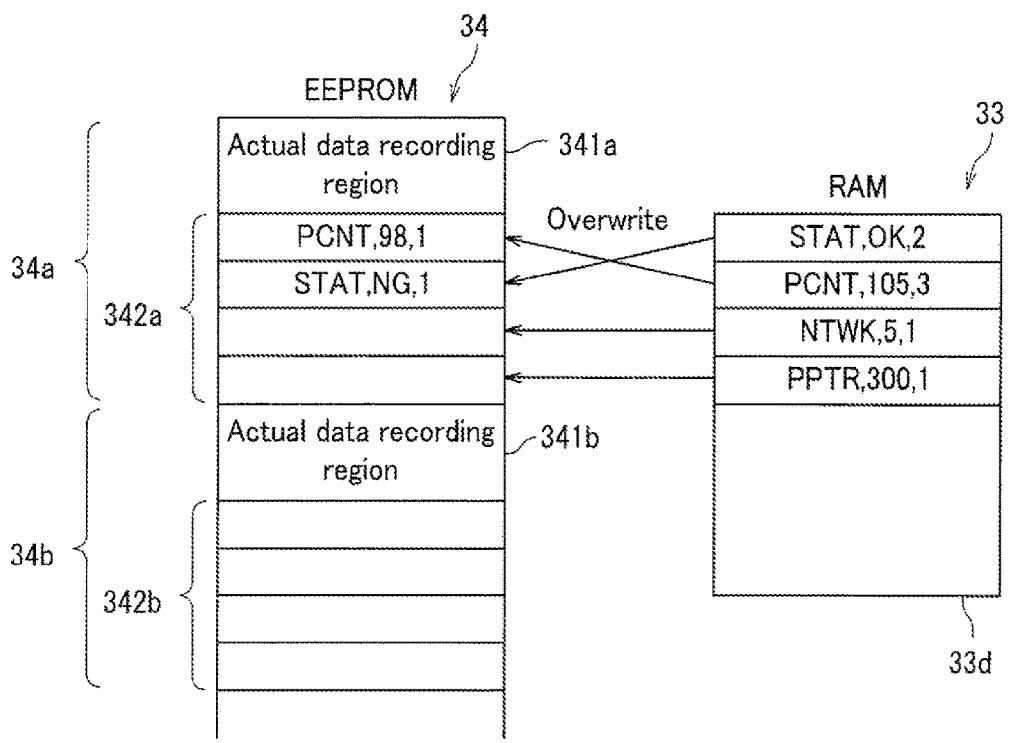
FIG. 13 illustrates a situation in which update information having the same data ID is overwritten.

Therefore, in the example illustrated in FIG. 13, the four pieces of update information in the log recording region 33d of the RAM 33 can all be written to the log recording region 342a of the first block. In other words, the number of blocks to which writing is performed can be reduced to one.

Through the above, the second point of modification of the image forming apparatus 10 according to the first embodiment and the modification method thereof have been explained.

Supplementary Explanation

The present disclosure is of course not limited to the embodiments described above and various alterations may be performed so long as such alterations do not deviate from the intended scope of the present disclosure.

What is claimed is:

1. An image forming apparatus comprising:
a volatile memory including
a first actual data region configured to record actual data therein, and
a first log region configured to record one or more pieces of update information therein, each including at least update data used for updating the actual data recorded in the first actual data region;
a flash memory that includes a plurality of blocks and that is configured to undergo initialization in block units when either or both of the actual data and the update information are to be written thereto, each of the blocks including
a second actual data region configured to record at least a portion of the actual data therein, and
a second log region configured to record update information therein that is written from the first log region; and
a CPU configured to
write each of the one or more pieces of update information to the first log region when updating the actual data in the first actual data region using the update data, and
at a preset specific timing, collect one or more pieces of update information recorded in the first log region, write the one or more pieces of update information that are collected to the second log regions in accordance with a specific order, and subsequently initialize the first log region, wherein:
each of the one or more pieces of update information recorded in the first log region further includes a data identifier and a write count, the data identifier identifying the actual data that is updated, the write count being a counter indicating the number of times that data updating has been performed since performance of refresh processing;
the data identifier includes at least one of information indicating a printing counter used to count the number of printed sheets and information indicating a status of the image forming apparatus;
when pieces of update information recorded in the first log region have the same data identifier, the CPU determines a most recent piece of update information by selecting a piece of update information including a write count having a largest value from among the pieces of update information having the same data identifier; and at the preset specific timing, the CPU extracts a most recent piece of update information for each data identifier, based on the write counts, from among the one or more pieces of update information recorded in the first log region, collects one or more pieces of update information that are each extracted as the most recent piece of update information, writes the one or more pieces of update information that are collected to the second log regions in accordance with the specific order, and subsequently initializes the first log region;

when the CPU writes the one or more pieces of update information that are collected to the second log regions in accordance with the specific order, the CPU reads pieces of update information that are already recorded in the second log regions, and in a situation in which a piece of update information having the same data identifier as at least one of the one or more pieces of update information recorded in the first log region is present among the pieces of update information that are already recorded in the second log regions, the CPU overwrites the at least one piece of update information recorded in the first log region on the piece of update information having the same data identifier in the second log regions to reduce the number of blocks to which writing of update information is performed from the first log region to the second log regions; and except in the refresh processing, the CPU writes only the one or more pieces of update information from the volatile memory to the flash memory without writing the actual data.

2. The image forming apparatus according to claim 1, wherein when the one or more pieces of update information that are collected cannot be written to the second log region of one of the plurality of blocks due to the second log region having insufficient free space, the CPU performs the refresh processing by:

overwriting the actual data recorded in the first actual data region on corresponding actual data recorded in the second actual data regions; and initializing the first log region and the second log regions.

3. The image forming apparatus according to claim 1, wherein the preset specific timing includes at least one of a periodic timing triggered by a timer, a timing at which a collective writing command is executed during shutdown of the image forming apparatus, a timing at which specific actual data is updated, and a timing at which the first log region no longer has free space.

4. The image forming apparatus according to claim 1, wherein the specific order includes repetition of a preset order.

5. The image forming apparatus according to claim 1, wherein the volatile memory includes RAM, and
the flash memory includes EEPROM.

6. An image forming apparatus comprising:
a volatile memory including
a first actual data region configured to record actual data therein, and
a first log region configured to record one or more pieces of update information therein, each including at least update data used for updating the actual data recorded in the first actual data region;

a flash memory that includes a plurality of blocks and that is configured to undergo initialization in block units when either or both of the actual data and the update information are to be written thereto, each of the blocks including
a second actual data region configured to record at least a portion of the actual data therein, and
a second log region configured to record update information therein that is written from the first log region; and a CPU configured to
write each of the one or more pieces of update information to the first log region when updating the actual data in the first actual data region using the update data, and
at a preset specific timing, collect one or more pieces of update information recorded in the first log region, write the one or more pieces of update information that are collected to the second log regions in accordance with a specific order, and subsequently initialize the first log region, wherein:

each of the one or more pieces of update information recorded in the first log region further includes a data identifier and a write count, the data identifier identifying the actual data that is updated, the write count being a counter indicating the number of times that data updating has been performed since performance of refresh processing;

when pieces of update information recorded in the first log region have the same data identifier, the CPU determines a most recent piece of update information by selecting a piece of update information including a write count having a largest value from among the pieces of update information having the same data identifier, and at the preset specific timing, the CPU extracts a most recent piece of update information for each data identifier, based on the write counts, from among the one or more pieces of update information recorded in the first log region, collects one or more pieces of update information that are each extracted as the most recent piece of update information, writes the one or more pieces of update information that are collected to the second log regions in accordance with the specific order, and subsequently initializes the first log region;

when the CPU writes the one or more pieces of update information that are collected to the second log regions in accordance with the specific order, the CPU reads pieces of update information that are already recorded in the second log regions, and in a situation in which a piece of update information having the same data identifier as at least one of the one or more pieces of update information recorded in the first log region is present among the pieces of update information that are already recorded in the second log regions, the CPU overwrites the at least one piece of update information recorded in the first log region on the piece of update information having the same data identifier in the second log regions to reduce the number of blocks to which writing of update information is performed from the first log region to the second log regions;

except in the refresh processing, the CPU writes only the one or more pieces of update information from the volatile memory to the flash memory without writing the actual data; and when the one or more pieces of update information that are collected cannot be written to the second log region of one of the plurality of blocks due to the second log region having insufficient free space, the CPU performs the refresh processing by:
  overwriting the actual data recorded in the first actual data region on corresponding actual data recorded in the second actual data regions; and
  initializing the first log region and the second log regions.

* * * * *